A. J. KLONECK.
AMPLIFYING RELAY.
APPLICATION FILED MAR. 8, 1915. RENEWED DEC. 13, 1920.
1,369,284.
Patented Feb. 22, 1921.
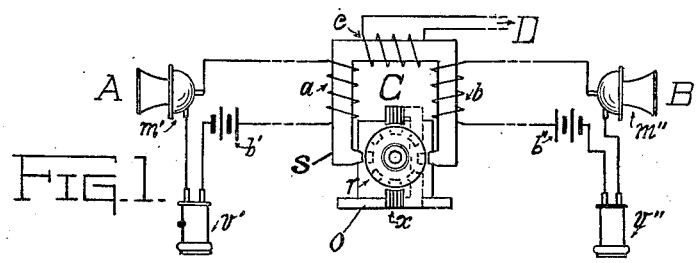
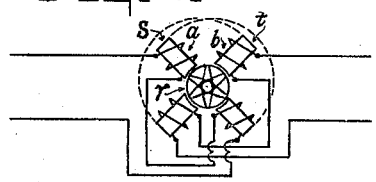
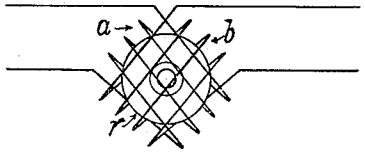
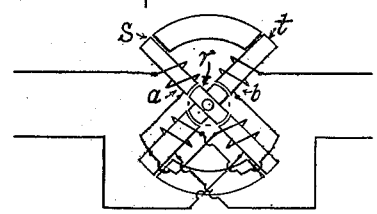
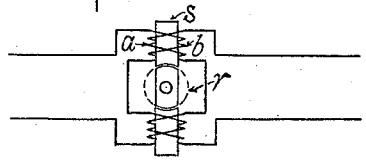
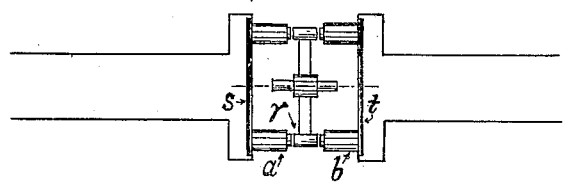
WITNESSES:
Norbert Landau.
Martin Poppelauer.
INVENTOR
August J. Kloneck.

UNITED STATES PATENT OFFICE.

AUGUST J. KLONECK, OF NEW YORK, N. Y.

AMPLIFYING-RELAY.

1,369,284.     Specification of Letters Patent.     Patented Feb. 22, 1921.

Application filed March 8, 1915, Serial No. 12,784. Renewed December 13, 1920. Serial No. 430,551.

*To all whom it may concern:*

Be it known that I, AUGUST J. KLONECK, a citizen of the United States, and a resident of New York, in the county and State of New York, have invented certain new and useful Improvements in Amplifying-Relays, of which the following is a specification.

The present invention relates to systems of repeating and amplifying electric currents, and more particularly to that of amplifying currents for telephones or other devices between two or more distant stations.

One object of the invention is to provide suitable circuits for the purpose to obtain an efficient repeating system.

Another object of the invention is to provide suitable generators for the purpose to repeat and to amplify the precise character of the transmitting currents.

A further object of the invention is to provide a system of repeating and amplifying electric currents which is capable for use in connection with two or more intercommunicating signal stations.

A still further object of this invention is to provide an electric generator for amplifying electric currents, of which the energizing and repeating coils are similar and interchangeable.

These and other allied objects are attained by the novel arrangement and combination of elements hereinafter described and shown in the drawing, forming a part of this specification and in which:

Figure 1 shows diagrammatically the generator and repeating coils of the same. The call bells, switches and their connections are omitted and not necessary for a complete understanding of the invention.

Fig. 2 shows another type of a current generator the energizing and repeating coils of which are arranged on the stator, while the rotor breaks off the magnetic flux from the coils, amplifying the current by rotation.

Fig. 3 shows another type of a current generator of which one coil serves as the energizing coil while the other coil generates current by means of the rotating booster.

Fig. 4 illustrates another amplifying generator of the stationary energizing and repeating coil type.

Fig. 5 shows another type of a current generator applied for this purpose.

Fig. 6 shows a further type of electric generator, the energizing and repeating coils of which are on separate stators and in inductive connection with each other through the rotating inductor.

Like parts are indicated by similar characters of reference.

Referring more particularly to the drawing, the letter A represents a telephone apparatus, which in the simple form consists of a source of electrical current $b'$, a transmitter $m'$, and the receiver $v'$. The letter B represents another telephone apparatus of similar equipment. The letter C denotes a relay station, assumed to be connected into the circuit at any point thereof, where an amplification of the signal current is desired. The letter D represents the wire connections for more than two telephones or other signal stations. The relay station C consists of a current generator having energizing and repeating coils $a$, $b$, and $c$ respectively. Any one of the coils may be the energizing coil while the others are repeating or receiving coils.

The stator is represented by letter $s$, the rotor of the generator by letter $r$. Each of the coils $a$, $b$, and $c$ is in inductive connection with respect to the others and every coil of the system is in connection with another telephone or signal apparatus. The rotor $r$ may be of the inductor type, having pole projections as shown in dotted lines. When the same is rotated, the impedance of the rotor will continuously vary the impedance of the stator, causing the generation of current of a higher value in the repeating coils, than that current, which is flowing from a telephone to the energizing coil of the generator. It will be noted, that each coil may be an energizing coil of the generator, if that apparatus to which one coil belongs, is transmitting; the remaining coils are then repeating coils. The rotor will be employed with or without pole projections and the poles of the stator are pointed to concentrate the magnetic flux at that point of the circumference of the rotor. The letter $x$ denotes a demagnetizer of iron, the office of it is to equalize and thus deënergize the magnetic charge in the rotor, preventing a double repetition of the same wave of the current by a local remanent magnetic impression upon the rotor. A motor $o$ serves to rotate the rotor $r$.

In Fig. 2 the letters $a$ and $b$ represent two similar coils, serving alternately as energizing or repeating coils of the generator. These coils are assumed to be connected to telephone apparatus, and arranged on separate field magnets $s$ and $t$, respectively. The field magnets may form parts of a single, or of two separate stators, as convenient or desired. The rotor $r$ of this generator may preferably be of a construction, capable of magnetic hysteresis. Such rotors are known in the art of electric motor construction; for this purpose of amplifying feeble currents, the rotor, consisting of a disk of copper or steel may be sufficient, but a coil wound non-metallic rotor may also be used for it.

In Fig. 3, the letters $a$ and $b$ designate two coils, and $r$ a rotating body within the coils. The rotor may be of similar construction as described in connection with the generator of Fig. 2.

In Fig. 4, the letters $a$ and $b$ represent coils upon the field magnets $s$ and $t$, respectively. In the general principle, this generator acts like that described in connection with Fig. 1. The rotor $r$, may consist of a pole or a disk inductor, as convenient or desired.

In Fig. 5, the generator is similar to that of Figs. 1 and 4, except that the coils $a$ and $b$ are arranged one above the other upon the field magnets, respectively.

In Fig. 6, the letters $a$ and $b$, denote coils on two separately arranged stators $s$ and $t$, respectively. The inductor $r$, if occasioned to rotate, causes a continuous varying of the magnetic impedance, thereby creating a current in the repeating coils.

The operation of the amplifying and repeating of electric currents is as follows: Suppose, one telephone or another signal apparatus is transmitting; then, current flows from this apparatus to one coil of the relay generator, energizing the generator. Now, if the inductor is occasioned to rotate, then an amplified current is produced in the other coils of the generator, which are in connection with receiving signal apparatus. As each of the coils of the generator may serve as the energizing or as a repeating coil, the operation of this relay apparatus is very simple. Further by employing a plurality of coils and connecting each of the coils to a further signal station, any number of signal stations or apparatus may be brought in communication with each other. Any local remanent magnetic charge of the rotor is destroyed by the demagnetizer $x$, thus preventing a double repetition of the same wave of the current which is considered necessary to obtain a clearly relayed signal.

Having fully described my invention, I claim as new and desire to secure by Letters Patent:

1. The combination, of transmitting and receiving apparatus and an amplifying generator, the latter having a stator and rotor and field coils, the latter serving as energizing and repeating coils of said repeating generator, said rotor being of a magnetic metal and a driving means for rotating said rotor, whereby the magnetic flux between said coils will be varied.

2. An amplifying relay having a stator and rotor and a plurality of coil sets, the latter being adapted as energizing and repeating coils for transmitting and receiving apparatus, said stator having poles facing said rotor and means for deënergizing said rotor, the latter being arranged between the poles of the stator.

3. An amplifying dynamo having a stator and rotor and a plurality of independent coil sets, the latter being arranged on said stator, said rotor having a plurality of projections, said stator having pointed poles, facing the rotor.

4. An amplifying dynamo having a stator and rotor and a plurality of independent coil sets, the latter being arranged on said stator, said stator having pointed poles facing said rotor.

5. An amplifying dynamo having a stator and rotor and a plurality of independent coil sets, and means adapted to deënergize said rotor, a plurality of transmitting and receiving apparatus connected to said coil sets, said stator having poles facing said rotor, said deënergizing means having poles arranged between the poles of said stator.

6. An amplifying relay dynamo having a plurality of independent coil sets and a rotor, said rotor having projecting portions.

7. An amplifying relay dynamo having a plurality of independent coil sets, a rotor and means to deënergize said rotor.

8. An amplifying relay dynamo having a plurality of independent coil sets, a rotor and means to deënergize said rotor, said rotor having projecting portions.

9. The method of amplifying electrical current between signal stations, which consists in employing independent field coils of a generator as repeating coils, utilizing the rotor for varying the magnetic flux between the poles of said field, and employing means for deënergizing the rotor of the residual magnetism.

10. In an amplifying relay the combination, of a dynamo having a plurality of coils, a stator and a rotor and means to deenergize said rotor, said rotor having projecting portions, said stator having pointed poles facing said rotor, and means adapted to rotate said rotor.

In testimony whereof I have signed my name to this specification in the presence of two subscribing witnesses.

AUGUST J. KLONECK.

Witnesses:
NORBERT LANDAU,
MARTIN POPPELAUER.